US011913176B2

(12) United States Patent
Melvelle et al.

(10) Patent No.: US 11,913,176 B2
(45) Date of Patent: Feb. 27, 2024

(54) HANDHELD TOOL FOR INSTALLING OR REMOVING RAILWAY TRACK FASTENERS

(71) Applicant: Melvelle Equipment Corp. Pty Ltd, New South Wales (AU)

(72) Inventors: Andrew Melvelle, New South Wales (AU); Ben de Rooy, New South Wales (AU); Gary Morris, New South Wales (AU)

(73) Assignee: MELVELLE EQUIPMENT CORP. PTY LTD, New South Wales (AU)

( * ) Notice: Subject to any disclaimer, the term of this patent is extended or adjusted under 35 U.S.C. 154(b) by 955 days.

(21) Appl. No.: 16/764,579

(22) PCT Filed: Nov. 16, 2018

(86) PCT No.: PCT/AU2018/051231

§ 371 (c)(1),
(2) Date: May 15, 2020

(87) PCT Pub. No.: WO2019/095018

PCT Pub. Date: May 23, 2019

(65) Prior Publication Data

US 2020/0283964 A1 Sep. 10, 2020

(30) Foreign Application Priority Data

Nov. 16, 2017 (AU) ................................ 2017904644

(51) Int. Cl.
*E01B 29/24* (2006.01)
*B25B 21/02* (2006.01)

(52) U.S. Cl.
CPC .............. *E01B 29/24* (2013.01); *B25B 21/02* (2013.01)

(58) Field of Classification Search
CPC ..... B25B 27/023; B25B 27/146; B25B 27/14; B25B 27/20; B25B 5/101; B25C 11/00;
(Continued)

(56) References Cited

U.S. PATENT DOCUMENTS 2,639,887 A 5/1951 Henry
6,935,620 B1 * 8/2005 Wilson .................... E01B 29/24 29/243.56

(Continued)

FOREIGN PATENT DOCUMENTS

EP 1422343 B1 4/2009
EP 2978899 B1 5/2017
FR 2500022 A1 8/1982

OTHER PUBLICATIONS

International Search Report issued by ISA/AU in connection with PCT/AU2018/051231 dated Feb. 19, 2019.

(Continued)

*Primary Examiner* — Tyrone V Hall, Jr.
(74) *Attorney, Agent, or Firm* — Levenfeld Pearlstein, LLC

(57) ABSTRACT

The present invention relates broadly to a handheld tool (10) for installing or removing a railway track fastener (12) in the form of an e-clip. The handheld tool (10) generally comprises a drive assembly (24) including an actuator sub-assembly (26), and a driven assembly (28) including an actuated sub-assembly (30) operatively coupled to the actuator sub-assembly (26). The actuator sub-assembly (26) actuates by rotation under the influence of an impact wrench (not shown) effecting longitudinal movement of the driven assembly (28). The drive assembly (24) further includes a jaw member (36) mounted to a bracket (38) extending from an actuator housing (34) of the drive assembly (24). The driven assembly (28) includes an actuated housing (40) within which the actuated sub-assembly (30) is housed. The (Continued)

driven assembly (28) further includes an opposing jaw member (42) mounted to an opposing bracket (44) extending from the actuated housing (40). In operation, the longitudinal movement of the driven assembly (28) relative to the drive assembly (24) effects closing of the opposing jaw members (36) and (42) relative to one another for installing or removing the e-clip fastener (12).

28 Claims, 5 Drawing Sheets

(58) Field of Classification Search
CPC .......... E01B 29/24; E01B 29/26; E01B 29/28; E01B 29/29; E01B 29/32; Y10T 29/53783; Y10T 29/5383; Y10T 29/53848
See application file for complete search history.

(56) References Cited

U.S. PATENT DOCUMENTS 7,076,851 B2 * 7/2006 Rousset .................. E01B 29/24
29/255
2006/0130697 A1 6/2006 Hertelendi et al.
2013/0319279 A1 12/2013 Melvelle

OTHER PUBLICATIONS

Written Opinion issued by ISA/AU in connection with PCT/AU2018/051231 dated Feb. 19, 2019.

* cited by examiner

HANDHELD TOOL FOR INSTALLING OR REMOVING RAILWAY TRACK FASTENERS

This is a National Stage Application of International Patent Application No. PCT/AU2018/051231, filed 16 Nov. 2018, which claims the benefit of and priority to Australian (AU) Patent Application No. 2017904644, filed 16 Nov. 2017, the entireties of which are incorporated fully herein by reference.

TECHNICAL FIELD

The present invention relates broadly to a handheld tool for installing or removing a railway track fastener including resilient fasteners such as an E-clip.

BACKGROUND OF INVENTION

Railway track is usually fixed to the underlying supporting sleeper made of timber, concrete or steel using a variety of fasteners including traditional heavy gauge coach screws into timber sleepers, or resilient clips of various designs inserted under load into sleeper fittings or collars on both sides of each track. Railway track fastening technology often relies on the use of basic hand tools for both the installation and removal of the resilient clips. Removal of clips may involve the use of a rivet punch and sledge hammer to impact the clip in order to dislodge and remove it. Often use of these basic hand tools result in occupational health and safety risks where for example resilient clips become dangerous projectiles when freed suddenly. Improvisation in the removal or installation process, using heavy tools such as sledge hammers, also results in the possibility for operator injury.

Recently, the emergence of specialised pneumatic or hydraulic equipment from a variety of international manufacturers has improved the safety, efficiency, and ease of clip insertion and removal. These machines are typically used by one or perhaps two operators, and usually consist of a chassis mounted and rolling on the track rail(s), and a workhead attached to the chassis and incorporating an insertion/removal mechanism. However, machines currently in the marketplace have at least the following shortcomings:

i) they are relatively heavy and require lifting equipment to transport to site and then locate on the railway track;

ii) they rely upon heavy hydraulic drive systems together with their associated and relatively large power packs, such as diesel-fueled electrical generators.

SUMMARY OF INVENTION

According to a first aspect of the present invention there is provided a handheld tool for installing or removing a railway track fastener, said handheld tool comprising:

a drive assembly including an actuator sub-assembly mounted for actuation within an actuator housing, the drive assembly also including a jaw member mounted to the actuator housing and adapted to contact either a rail seat or the track fastener;

a driven assembly including an actuated sub-assembly operatively coupled to the actuator sub-assembly for longitudinal movement of the driven assembly relative to the drive assembly on actuation of the actuator sub-assembly, the driven assembly also including i) an actuated housing within which the actuated sub-assembly is housed, and ii) an opposing jaw member mounted to the actuated housing and adapted to contact either the track fastener or the rail seat whereby in operation the longitudinal movement of the driven relative to the drive assemblies effects closing of the opposing jaw members relative to one another for installing or removing the track fastener.

Preferably the actuator sub-assembly includes an actuator shaft which actuates by rotation within the actuator housing. More preferably the actuated sub-assembly includes i) a threaded coupling arranged to be engaged by the rotating actuator shaft, ii) an adaptor sleeve mounted within the actuated housing and secured to the threaded coupling. Even more preferably the threaded coupling is in the form of an internally threaded nut arranged to be engaged by a corresponding external thread in the actuator shaft.

Preferably the external thread of the actuator shaft has a profile shape wherein rotation of the actuator shaft effects axial movement of the threaded coupling which is not back-driveable with respect to the actuator shaft. More preferably the actuator shaft includes an external thread of a trapezoidal, square or buttress profile.

Preferably the actuator housing includes an inner sleeve arranged, on the longitudinal movement of the driven relative to the drive assemblies, to reciprocate within an outer sleeve of the actuated housing. More preferably the outer sleeve is mounted coaxial with the adaptor sleeve. Even more preferably the actuator shaft is mounted coaxial with the inner sleeve and is aligned coaxially with the outer sleeve. Still more preferably the actuated sub-assembly also includes a coaxial bearing mounted to the threaded coupling and configured to slide within the inner sleeve.

Preferably the actuated sub-assembly includes one or more keys fixed to the adaptor sleeve and arranged to slide for the longitudinal movement of the driven relative to the drive assemblies within corresponding keyways included in the inner sleeve of the actuator housing. More preferably the keys and the corresponding keyways are in transverse section shaped substantially complementary to one another to prevent rotation of the actuated sub-assembly relative to the inner sleeve whilst there is longitudinal movement of the driven relative to the drive assemblies.

Preferably the actuated housing includes one or more axially separated coaxial bushes mounted internally of the outer sleeve, the inner sleeve designed to slide within the coaxial bushes. More preferably an outer journaled surface of the inner sleeve is hardened where the coaxial bushes slide in the course of the longitudinal movement of the driven relative to the drive assemblies. Even more preferably the hardened surface of the inner sleeve in cooperation with the coaxial bushes permits said sliding movement under the influence of a bending moment imparted on the drive and driven assemblies in the course of operating the handheld tool. Still more preferably the actuated housing also includes a resilient seal mounted to the outer sleeve and arranged to seal with the inner sleeve to prevent the ingress of contaminants to an annular space between the inner and outer sleeves.

Preferably the handheld tool also comprises a drive coupling assembly connected to the drive assembly and arranged to provide coupling of a power source to the drive coupling assembly for actuation of the actuator sub-assembly. More preferably the drive coupling assembly includes a gearbox permitting coupling of the power source in a direction substantially perpendicular to a longitudinal axis of the actuator sub-assembly. Even more preferably the power source is in the form of an electrically powered and portable impact tool.

Preferably the drive assembly includes a thrust bearing mounted about the actuator shaft and within the actuator housing, said thrust bearing designed to accommodate axial forces associated with operation of the handheld tool.

Preferably the opposing jaw members are each detachably mounted to the actuator and the actuated housing, respectively. More preferably the jaw members are suited to the rail seat configuration to which the handheld tool is applied. Even more preferably the opposing jaws are capable of being reversibly mounted to either the actuator housing or the actuated housing depending on whether the tool is being operated to remove or apply the track fastener, respectively.

Preferably the handheld tool also comprises a saddle assembly mounted to the actuated sub-assembly and adapted to locate upon a railway track associated with the track fastener. More preferably the saddle assembly includes a bracket mounted to the adaptor sleeve, and an adjustable post moveably coupled to the bracket and adapted to rest upon a railhead of the railway track to assist in resisting a tipping moment whilst operating the handheld tool.

According to a second aspect of the invention there is provided a tool for installing or removing a railway track fastener, said handheld tool comprising:

- a drive assembly including an actuator sub-assembly mounted for actuation within an actuator housing, the drive assembly also including a jaw member detachably mounted to the actuator housing and adapted to contact either a rail seat or the track fastener;
- a driven assembly including an actuated sub-assembly operatively coupled to the actuator sub-assembly for longitudinal movement of the driven assembly relative to the drive assembly on actuation of the actuator sub-assembly, the driven assembly also including i) an actuated housing within which the actuated sub-assembly is housed, and ii) an opposing jaw member detachably mounted to the actuated housing and adapted to contact either the track fastener or the rail seat whereby in operation the longitudinal movement of the driven relative to the drive assemblies effects closing of the opposing jaw members relative to one, said jaws being reversibly mounted to either the actuator housing or the actuated housing depending on whether the tool is operated to remove or apply the track fastener, respectively.

Preferably the actuator sub-assembly includes an actuator shaft which actuates by rotation within the actuator housing. More preferably the actuated sub-assembly includes i) a threaded coupling arranged to be engaged by the rotating actuator shaft, ii) an adaptor sleeve mounted within the actuated housing and secured to the threaded coupling. Even more preferably the threaded coupling is in the form of an internally threaded nut arranged to be engaged by a corresponding external thread in the actuator shaft.

Preferably the external thread of the actuator shaft has a profile shape wherein rotation of the actuator shaft effects axial movement of the threaded coupling which is not back-driveable with respect to the actuator shaft. More preferably the actuator shaft includes an external thread of a trapezoidal, square or buttress profile.

BRIEF DESCRIPTION OF DRAWINGS

In order to achieve a better understanding of the nature of the present invention a preferred embodiment of a handheld tool for installing or removing a railway track fastener will now be described, by way of example, with reference to the accompanying drawings in which.

DETAILED DESCRIPTION

Figure 1:
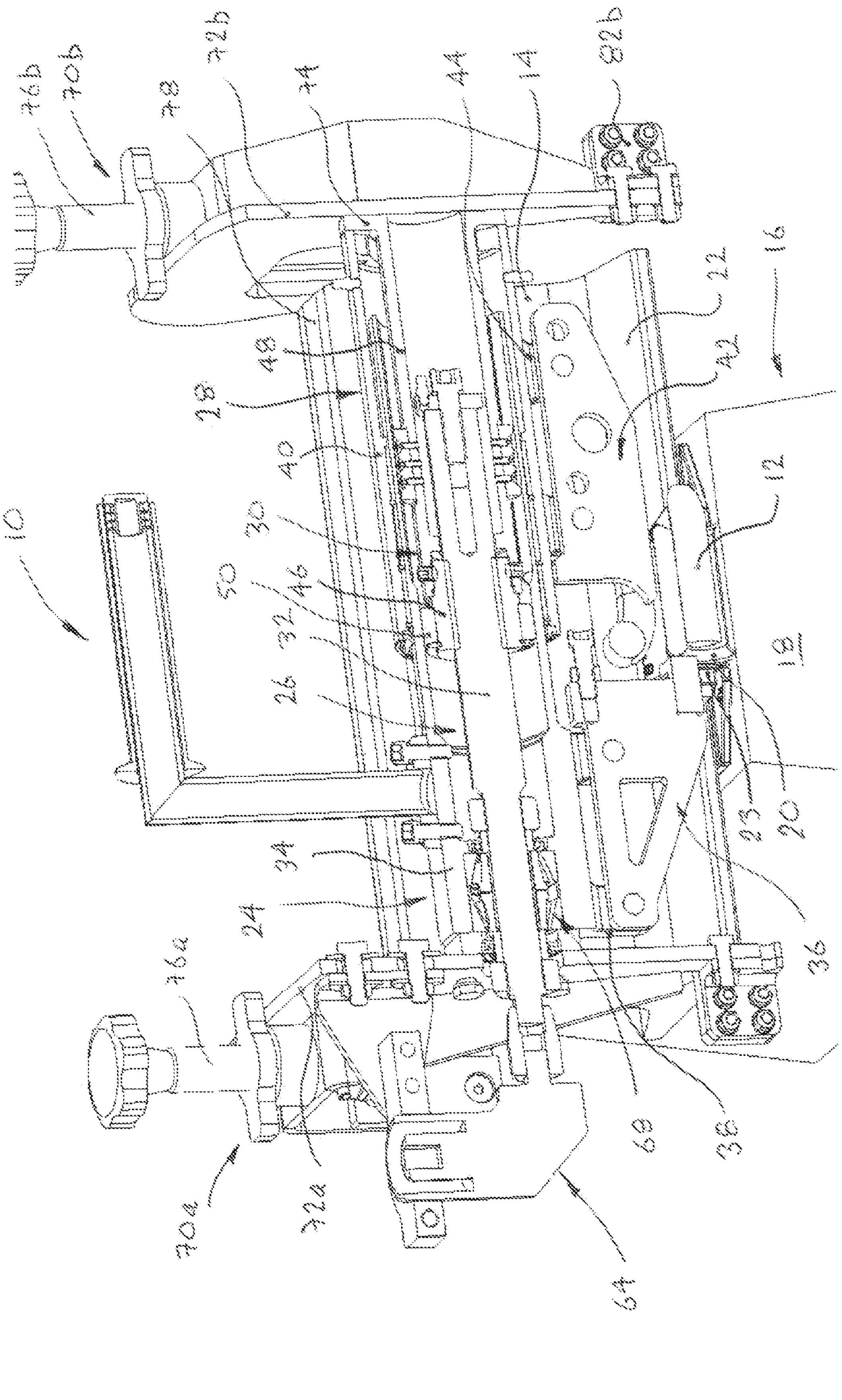
FIG. 1 is a perspective view shown in part cross-section of a handheld tool for installing or removing a railway track fastener according to one embodiment of the invention.

As best seen in FIG. 1, there is according to one aspect of the invention a handheld tool 10 for installing or removing a railway track fastener 12. The railway track fastener 12 is in this example a resilient fastener in the form of an e-clip. The e-clip 12 is configured in a conventional manner to secure railway track 14 to a rail seat 16. The rail seat 16 includes sleeper 18 together with an insert or cast-in shoulder 20 which is engaged by the e-clip fastener 12 for securing of a foot 22 of the railway track 14 via an intermediate liner or biscuit 23. In this embodiment the handheld tool 10 is powered by an electrically powered and portable impact tool in the form of a conventional impact wrench (not shown).

The handheld power tool 10 generally comprises a drive assembly 24 including an actuator sub-assembly 26, and a driven assembly 28 including an actuated sub-assembly 30 operatively coupled to the actuator sub-assembly 26. More particularly, the actuator sub-assembly 26 includes an actuator shaft 32 which actuates by rotation under the influence of the impact wrench (not shown) effecting longitudinal movement of the driven assembly 28 relatively to the drive assembly 24. The drive assembly 24 of this embodiment also includes an actuator housing 34 in the form of an inner sleeve within which the actuator shaft 32 rotates. The drive assembly 24 further includes a jaw member 36 mounted to a bracket 38 extending from the inner sleeve 34.

The driven assembly 28 of this embodiment includes an actuated housing 40 in the form of an outer sleeve within which the actuated sub-assembly 30 is housed. The driven assembly 28 further includes an opposing jaw member 42 mounted to an opposing bracket 44 extending from the outer sleeve 40. In operation, the longitudinal movement of the driven assembly 28 relative to the drive assembly 24 effects closing of the opposing jaw members 36 and 42 relative to one another for installing or removing the e-clip fastener 12.

In this embodiment the opposing jaw members 36 and 42 are each detachably mounted to respective of the brackets 38 and 44. The jaw member 36 shown on the left hand side is adapted to contact the rail seat 16 or more particularly the cast-in shoulder 20 whereas the opposing jaw 42 seen on the right hand side is configured to contact the e-fastener clip 12. In this configuration, the handheld power tool 10 on closure of the opposing jaw members 36 and 42 operates to install the e-clip fastener 12. In order to remove the e-clip fastener 12, the detachable jaw member 42 is mounted to the other of the brackets 38. The other detachable jaw member 36 is replaced with a substitute jaw member (not shown) which is a variation on that jaw member 36 and suitable for contacting the rail seat 16 on an opposing side. In this configuration (not shown), closure of the opposing jaw members such as 42 effects contact with the cast-in shoulder 20 and the e-clip fastener 12 for its removal.

Figure 2:
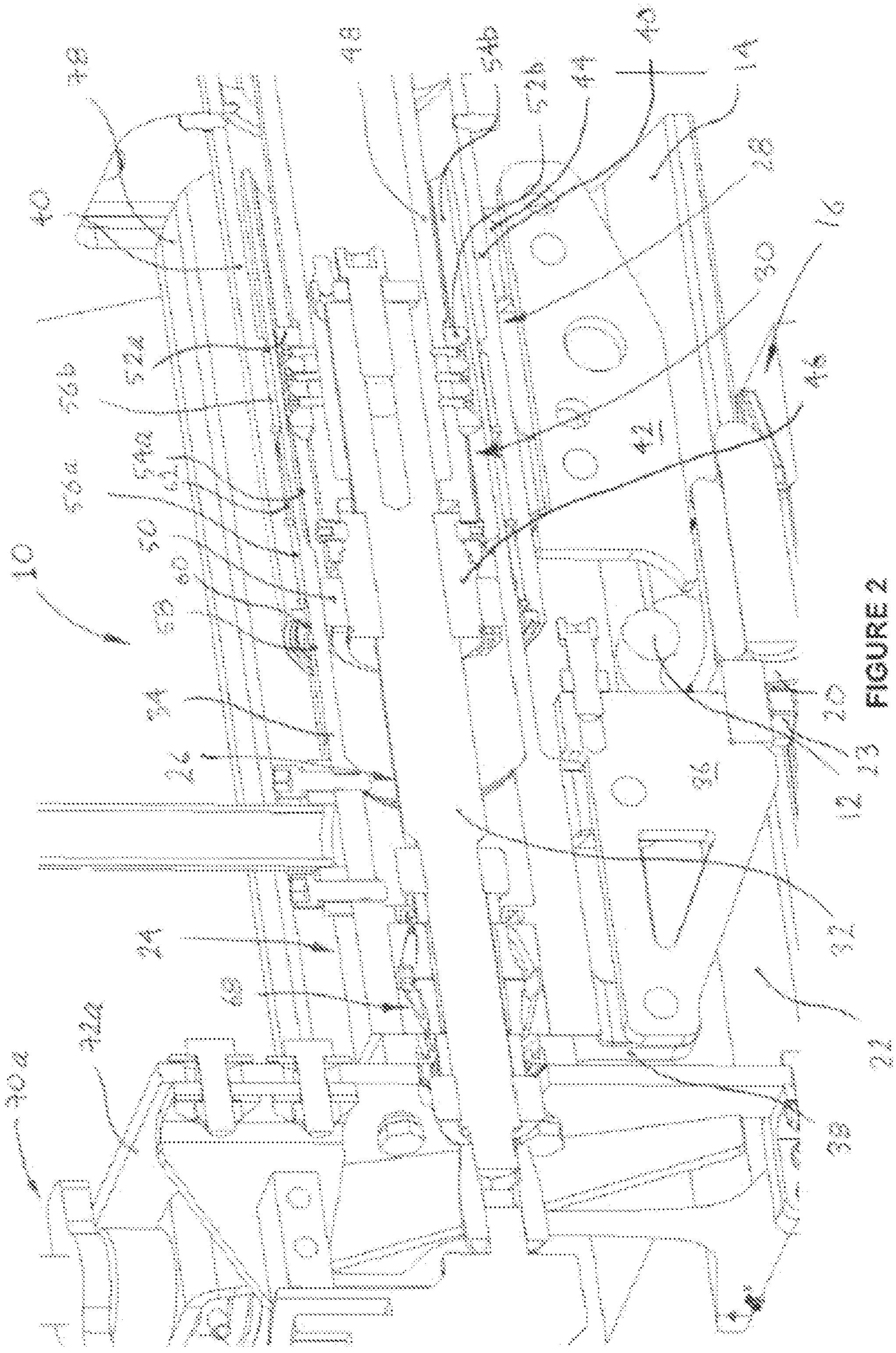
FIG. 2 is an enlarged perspective view of the handheld tool of FIG. 1 in conjunction with an associated railway track fastener and rail seat.
Figure 3:
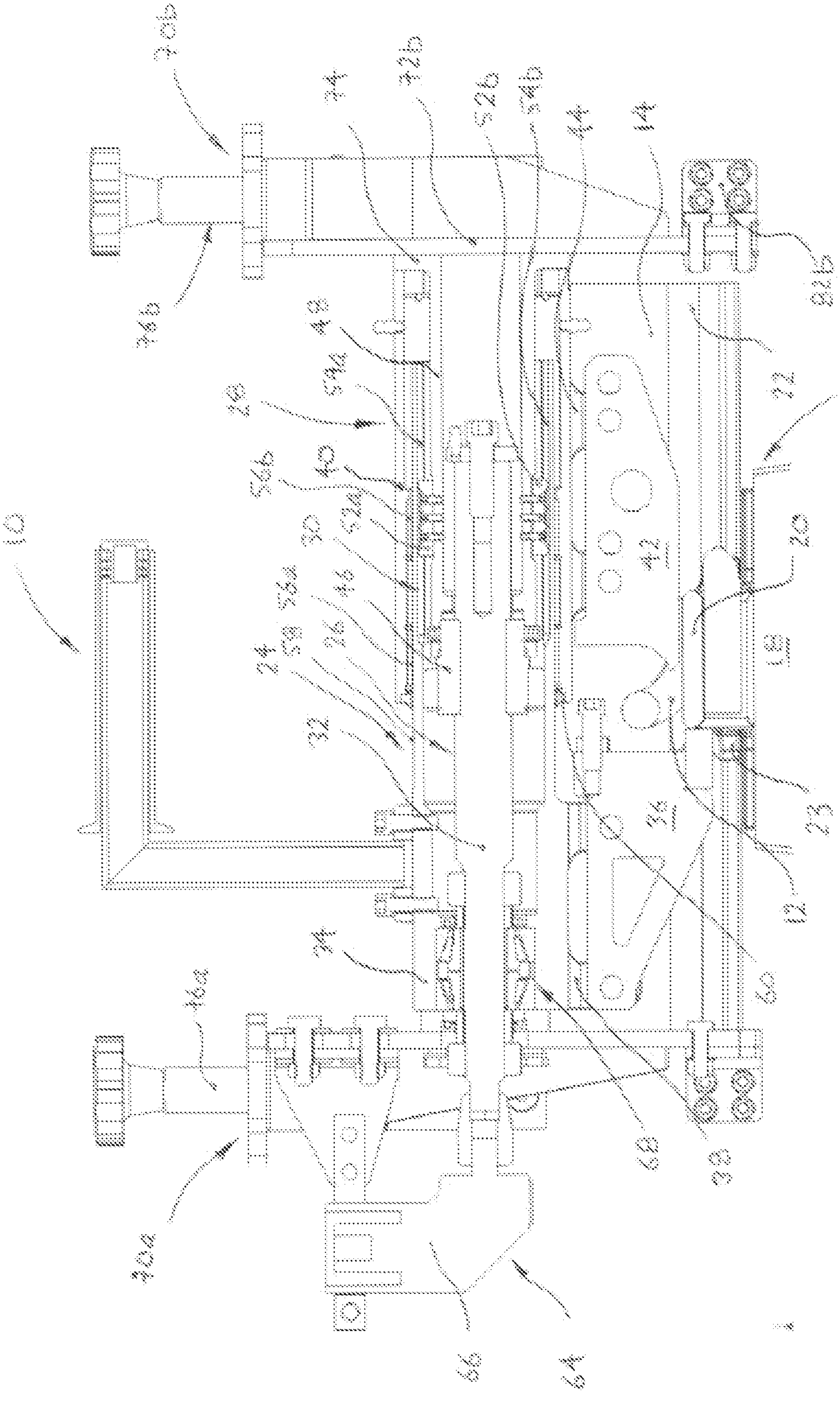
FIG. 3 is a side elevation shown in part cross-section of the handheld tool of the preceding figures.

As best seen in FIGS. 2 and 3, the actuated sub-assembly 30 includes a threaded coupling 46 arranged to be engaged by the rotating actuator shaft 32. The actuated sub-assembly 28 also includes an adaptor sleeve 48 mounted within the actuated housing or outer sleeve 40 and secured to the threaded coupling 46. In this example, the threaded coupling 46 is in the form of an internally threaded nut arranged to be engaged by a corresponding external thread in the actuator shaft 32. Although not illustrated, the external thread of the actuator shaft 32 has a trapezoidal profile shape wherein rotation of the actuator shaft 32 within the threaded nut 46 effects axial movement of the threaded nut 46. The rotational force or impulse torque imparted intermittently on the actuator shaft 32 by the impact wrench in cooperation with the complementary threads effects axial movement of the threaded nut 46 relative to the actuator shaft 32. The threaded nut 46 by the design of the complementary threads is not axially back-driveable and thus avoids reverse rotation of the actuator shaft 32.

In operation of the handheld power tool 10, the inner sleeve 34 on rotation of the actuator shaft 32 reciprocates within the outer sleeve 40. The outer sleeve 40 is mounted coaxial with the adaptor sleeve 48 and together they coaxially align with the actuator shaft 32 which is mounted coaxial with the inner sleeve 34. The actuated sub-assembly 30 includes a coaxial bearing 50 mounted to the threaded coupling or nut 46 and configured to slide within the inner sleeve 34. The coaxial bearing 50 ensures the actuator shaft 32 remains concentric with the inner sleeve 34 to prevent deflection of the drive assembly 24 or the driven assembly 28.

The actuated sub-assembly 28 also includes a pair of opposing keys 52*a* and 52*b* fixed to the adaptor sleeve 48 and arranged to slide for longitudinal movement within corresponding keyways 54*a* and 54*b* formed in the inner sleeve 34. The keys 52*a/b* and corresponding keyways 54*a/b* are in transverse section shaped substantially complementary to one another. This keyed arrangement, on rotation of the actuator shaft 32 and the resulting longitudinal movement of the driven assembly 28 relative to the drive assembly 24, prevents rotation or twisting of the actuated sub-assembly 30 and, in particular, the threaded nut 46 and the adaptor sleeve 48.

In this embodiment the actuated housing or outer sleeve 40 includes a pair of axially separated coaxial bushes 56*a* and 56*b* arranged to slide along an outer journaled surface 58 of the inner sleeve 34. The journaled surface 58 of the inner sleeve 34 is hardened where the coaxial bushes 56*a/b* slide, this hardening being effected by an electroless nickel or other alloy deposition process. The hardened outer journaled surface 58 of the inner sleeve 34 in cooperation with the coaxial bushes 56*a/b* permit sliding movement under the influence of a bending moment imparted on the drive assembly 24 and the driven assembly 28 in the course of operating the handheld tool 10. The driven assembly 28 also includes a resilient seal 60 mounted to the outer sleeve 40. The resilient seal 60 in the form of a wiper seal is arranged to seal with the inner sleeve 34 to prevent the ingress of contaminants to an annular space 62 between the inner sleeve 34 and the outer 40 sleeve.

Figure 4:
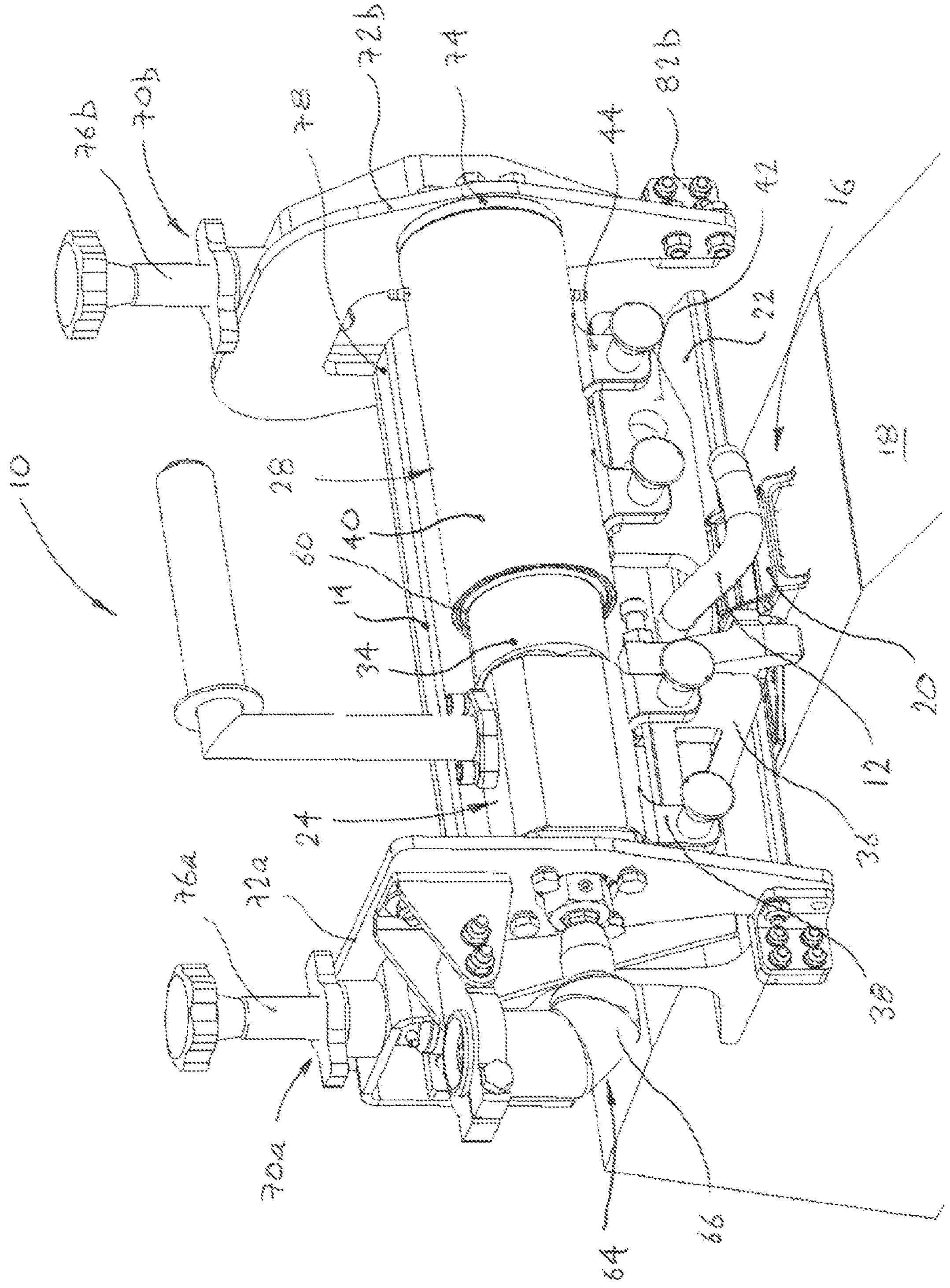
FIGS. 4 and 5 are alternate perspective views of the handheld tool of the embodiment of the preceding figures.
Figure 5:
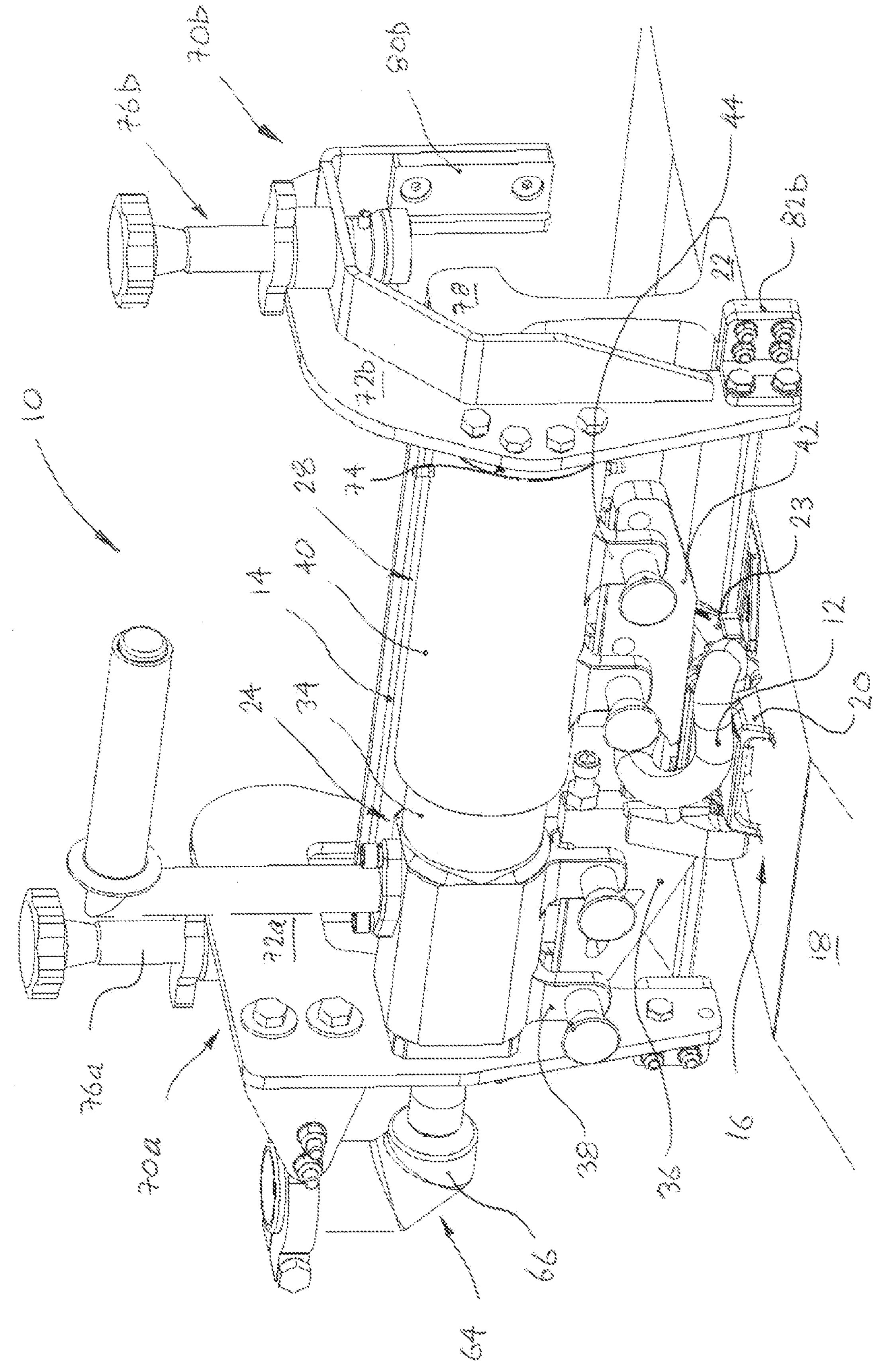

As best seen in FIGS. 3 to 5, the handheld tool 10 also comprises a drive coupling assembly 64 connected to the drive assembly 24 and arranged to provide coupling of the power source or impact wrench (not shown) to the drive assembly 24. In this embodiment the drive coupling assembly 64 includes a 90 degree gearbox 66 permitting coupling of the impact wrench in an upright orientation substantially perpendicular to a longitudinal axis of the actuator sub-assembly 34. The drive assembly 24 as seen in FIG. 3 also includes a thrust bearing 68 mounted about the actuator shaft 32 and radially supported within the inner sleeve 34. The thrust bearing 68 is designed to accommodate axial forces associated with operation of the tool 10.

The handheld tool 10 also comprises a pair of saddle assemblies 70*a* and 70*b* mounted to the drive assembly 24 and the driven assembly 28, respectively. The saddle assemblies 70*a/b* are adapted to locate about the railway track 14 either side of the e-clip fastener 12 which is to be installed or removed. Each of the saddle assemblies such as 70*b* is of a similar construction including a support bracket 72*b* mounted to an annular flange 74 connected to the adaptor sleeve 48, and an adjustable post 76*b*. The adjustable post 76*b* is movably coupled to the bracket 72*b* and adapted to rest upon a rail head 78 of the railway track 14. The saddle assembly 70*b* also includes upper and lower contact pads 80*b* and 82*b* positioned to contact the railhead 78 and the foot 22 of the railway track 14, respectively. The saddle assemblies 70*a/b* either alone or in combination assist in resisting a tipping moment caused largely by the offset in the opposing jaw members 36/42 whilst operating the handheld tool 10.

It is expected that the handheld power tool 10 of this embodiment will be relatively lightweight and nonetheless generate the relatively high force required to install or remove the track fastener. For example, the handheld tool 10 may weigh up to around 20 kg and generate a closing force between its opposing jaw members 36/42 of around 4 tonne. The handheld tool 10 is in this case powered by a high torque and battery powered impact wrench which produces torque of at least 100 Nm. The handheld tool 10 will generally provide longitudinal movement or displacement of the opposing jaw members 36/42 of up to around 100 mm relative to one another.

Now that a preferred embodiment of a handheld tool for installing or removing a railway track fastener has been described it will be apparent to those skilled in the art that it has the following advantages:

1. the tool generates relatively high closing forces whilst being lightweight and thus capable of being operated by hand by a single person;
2. the tool is engineered to reduce bending moments which leads to its relatively lightweight construction which in turn allows it to be handheld;
3. the tool and in particular the telescopic inner and outer sleeve cooperate for sliding under the influence of bending forces imparted by the drive force of the drive assembly;
4. the tool is suitable for application to a range of differently configured rail seats by selecting and detachably mounting jaw members which can also be changed depending on whether the tool is used for application or removal of the track fastener.

Those skilled in the art will appreciate that the invention as described herein is susceptible to variations and modifications other than those specifically described. For example, the actuator sub-assembly need not be limited to the rotating actuator shaft but extends to other arrangements which effect the required longitudinal movement of the driven assembly relative to the drive assembly. The power source may vary from the impact wrench depending largely on the nature of the actuator sub-assembly. The drive coupling assembly may act axially in line with the tool rather than the 90 degree arrangement of the preferred embodiment.

In another aspect of the invention the tool need not necessarily be handheld. For example, the tool may be permanently or temporarily mounted to a relatively lightweight trolley which rests upon one or both rails with which the fastener is associated. In this variation the opposing jaws are detachably mounted to respective of the actuator housing and the actuated housing. The jaws are interchangeable or reversible with one another depending on whether the tool is operated to remove or apply the track fastener.

All such variations and modifications are to be considered within the scope of the present invention the nature of which is to be determined from the foregoing description.

The invention claimed is:

1. A handheld tool for installing or removing a railway track fastener, said handheld tool comprising:

a drive assembly including an actuator sub-assembly mounted for actuation within an actuator housing, the drive assembly also including a jaw member mounted to the actuator housing and adapted to contact either a rail seat or the track fastener the actuator sub-assembly including an actuator shaft which actuates by rotation within the actuator housing;

a driven assembly including an actuated sub-assembly including i) a threaded coupling arranged to be engaged by the rotating actuator shaft, and ii) an adaptor sleeve mounted within the actuator housing and secured to the threaded coupling, said driven assembly operatively coupled to the actuator sub-assembly for longitudinal movement of the driven assembly relative to the drive assembly on actuation of the actuator sub-assembly, the driven assembly also including i) an actuated housing within which the actuated sub-assembly is housed, and ii) an opposing jaw member mounted to the actuated housing and adapted to contact either the track fastener or the rail seat whereby in operation the longitudinal movement of the driven relative to the drive assemblies effects closing of the opposing jaw members relative to one another for installing or removing the track fastener.

2. A handheld tool as claimed in claim 1 wherein the threaded coupling is in the form of an internally threaded nut arranged to be engaged by a corresponding external thread in the actuator shaft.

3. A handheld tool as claimed in claim 2 wherein the external thread of the actuator shaft has a profile shape wherein rotation of the actuator shaft effects axial movement of the threaded coupling which is not back-driveable with respect to the actuator shaft.

4. A handheld tool as claimed in claim 3 wherein the actuator shaft includes an external thread of a trapezoidal, square or buttress profile.

5. A handheld tool as claimed in claim 1 wherein the actuator housing includes an inner sleeve arranged, on the longitudinal movement of the driven relative to the drive assemblies, to reciprocate within an outer sleeve of the actuated housing.

6. A handheld tool as claimed in claim 5 wherein the outer sleeve is mounted coaxial with the adaptor sleeve.

7. A handheld tool as claimed in 5 wherein the actuator shaft is mounted coaxial with the inner sleeve and is aligned coaxially with the outer sleeve.

8. A handheld tool as claimed claim 5 wherein the actuated sub-assembly also includes a coaxial bearing mounted to the threaded coupling and configured to slide within the inner sleeve.

9. A handheld tool as claimed in claim 5 wherein the actuated sub-assembly includes one or more keys fixed to the adaptor sleeve and arranged to slide for the longitudinal movement of the driven relative to the drive assemblies within corresponding keyways included in the inner sleeve of the actuator housing.

10. A handheld tool as claimed in claim 9 wherein the keys and the corresponding keyways are in transverse section shaped substantially complementary to one another to prevent rotation of the actuated sub-assembly relative to the inner sleeve whilst there is longitudinal movement of the driven relative to the drive assemblies.

11. A handheld tool as claimed in claim 10 an outer journaled surface of the inner sleeve is hardened where the coaxial bushes slide in the course of the longitudinal movement of the driven relative to the drive assemblies.

12. A handheld tool as claimed in claim 11 wherein the hardened surface of the inner sleeve in cooperation with the coaxial bushes permits said sliding movement under the influence of a bending moment imparted on the drive and driven assemblies in the course of operating the handheld tool.

13. A handheld tool as claimed in claim 5 wherein the actuated housing includes one or more axially separated coaxial bushes mounted internally of the outer sleeve, the inner sleeve designed to slide within the coaxial bushes.

14. A handheld tool as claimed in claim 5 wherein the actuated housing also includes a resilient seal mounted to the outer sleeve and arranged to seal with the inner sleeve to prevent the ingress of contaminants to an annular space between the inner and outer sleeves.

15. A handheld tool as claimed in claim 1 also comprising a drive coupling assembly connected to the drive assembly and arranged to provide coupling of a power source to the drive coupling assembly for actuation of the actuator sub-assembly.

16. A handheld tool as claimed in claim 15 wherein the drive coupling assembly includes a gearbox permitting coupling of the power source in a direction substantially perpendicular to a longitudinal axis of the actuator sub-assembly.

17. A handheld tool as claimed in claim 15 wherein the power source is in the form of an electrically powered and portable impact tool.

18. A handheld tool as claimed in claim 1 wherein the drive assembly includes a thrust bearing mounted about the actuator shaft and within the actuator housing, said thrust bearing designed to accommodate axial forces associated with operation of the handheld tool.

19. A handheld tool as claimed in claim 1 wherein the opposing jaw members are each detachably mounted to the actuator and the actuated housing, respectively.

20. A handheld tool as claimed in claim 19 wherein the jaw members are suited to the rail seat configuration to which the handheld tool is applied.

21. A handheld tool as claimed in claim 19 wherein the opposing jaws are capable of being reversibly mounted to either the actuator housing or the actuated housing depending on whether the tool is being operated to remove or apply the track fastener, respectively.

22. A handheld tool as claimed in claim 1 also comprising a saddle assembly mounted to the actuated sub-assembly and adapted to locate upon a railway track associated with the track fastener.

23. A handheld tool as claimed in claim 22 wherein the saddle assembly includes a bracket mounted to the adaptor sleeve, and an adjustable post moveably coupled to the bracket and adapted to rest upon a railhead of the railway track to assist in resisting a tipping moment whilst operating the handheld tool.

24. A handheld tool for installing or removing a railway track fastener, said handheld tool comprising:

a drive assembly including an actuator sub-assembly including an actuator shaft which actuates by rotation within the actuator housing, said actuator sub-assembly mounted for actuation within the actuator housing, the drive assembly also including a jaw member detachably mounted to the actuator housing and adapted to contact either a rail seat or the track fastener;

a driven assembly including an actuated sub-assembly operatively coupled to the actuator sub-assembly for longitudinal movement of the driven assembly relative to the drive assembly on actuation of the actuator sub-assembly, the driven assembly also including i) an actuated housing within which the actuated sub-assembly is housed, and ii) an opposing jaw member detachably mounted to the actuated housing and adapted to contact either the track fastener or the rail seat whereby in operation the longitudinal movement of the driven relative to the drive assemblies effects closing of the opposing jaw members relative to one, said jaws being reversibly mounted to either the actuator housing or the actuated housing depending on whether the tool is operated to remove or apply the track fastener, respectively.

25. A handheld tool as claimed in claim 24 wherein the actuated sub-assembly includes i) a threaded coupling arranged to be engaged by the rotating actuator shaft, ii) an adaptor sleeve mounted within the actuated housing and secured to the threaded coupling.

26. A handheld tool as claimed in claim 25 wherein the threaded coupling is in the form of an internally threaded nut arranged to be engaged by a corresponding external thread in the actuator shaft.

27. A handheld tool as claimed in claim 26 wherein the external thread of the actuator shaft has a profile shape wherein rotation of the actuator shaft effects axial movement of the threaded coupling which is not back-driveable with respect to the actuator shaft.

28. A handheld tool as claimed in claim 27 wherein the external thread of the actuator shaft is of a trapezoidal, square or buttress profile.

* * * * *